Figure 1:
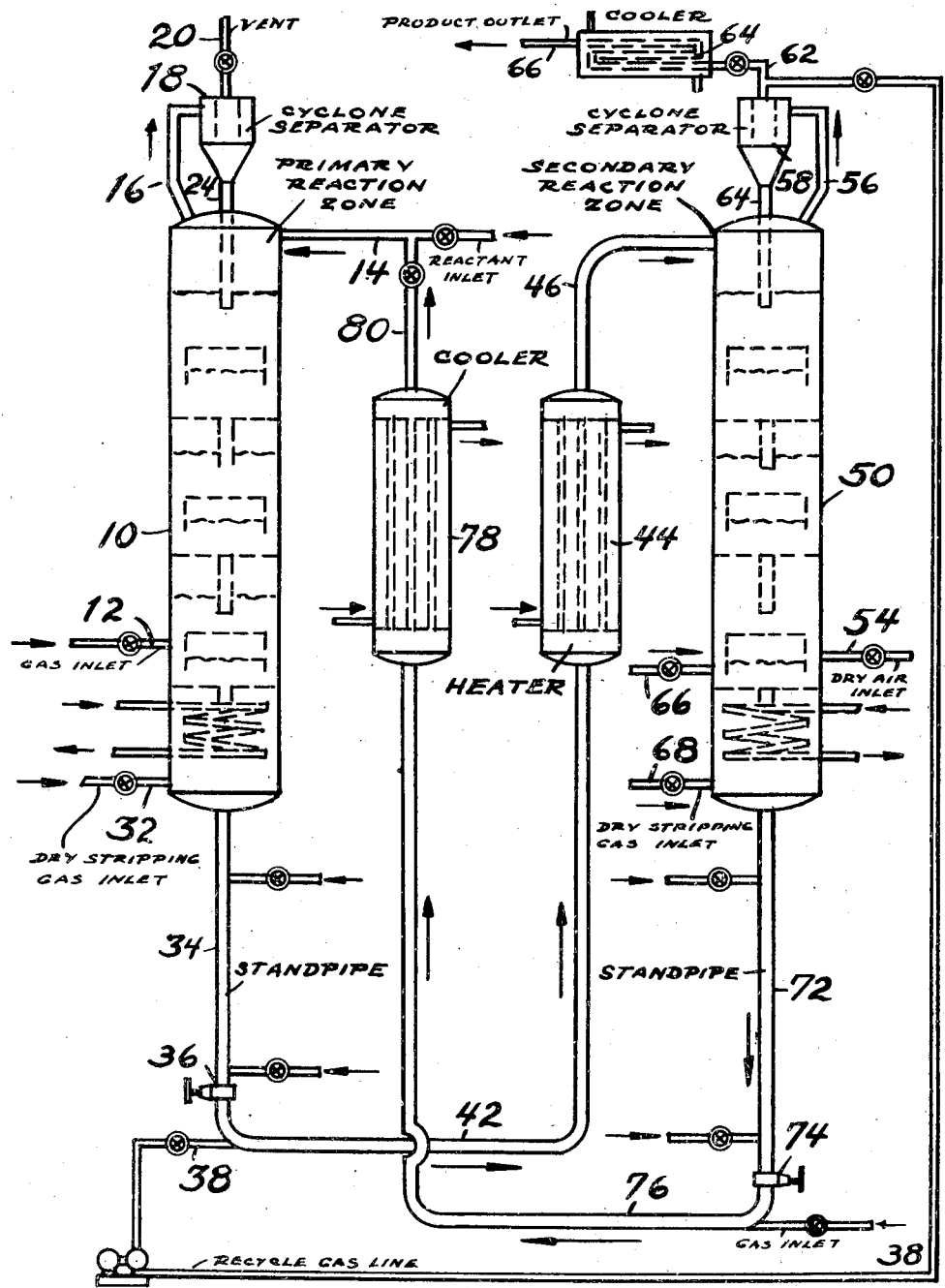

March 2, 1948.  E. V. MURPHREE  2,436,870
PREPARATION OF CHLORINE
Filed Oct. 31, 1942  2 Sheets-Sheet 2
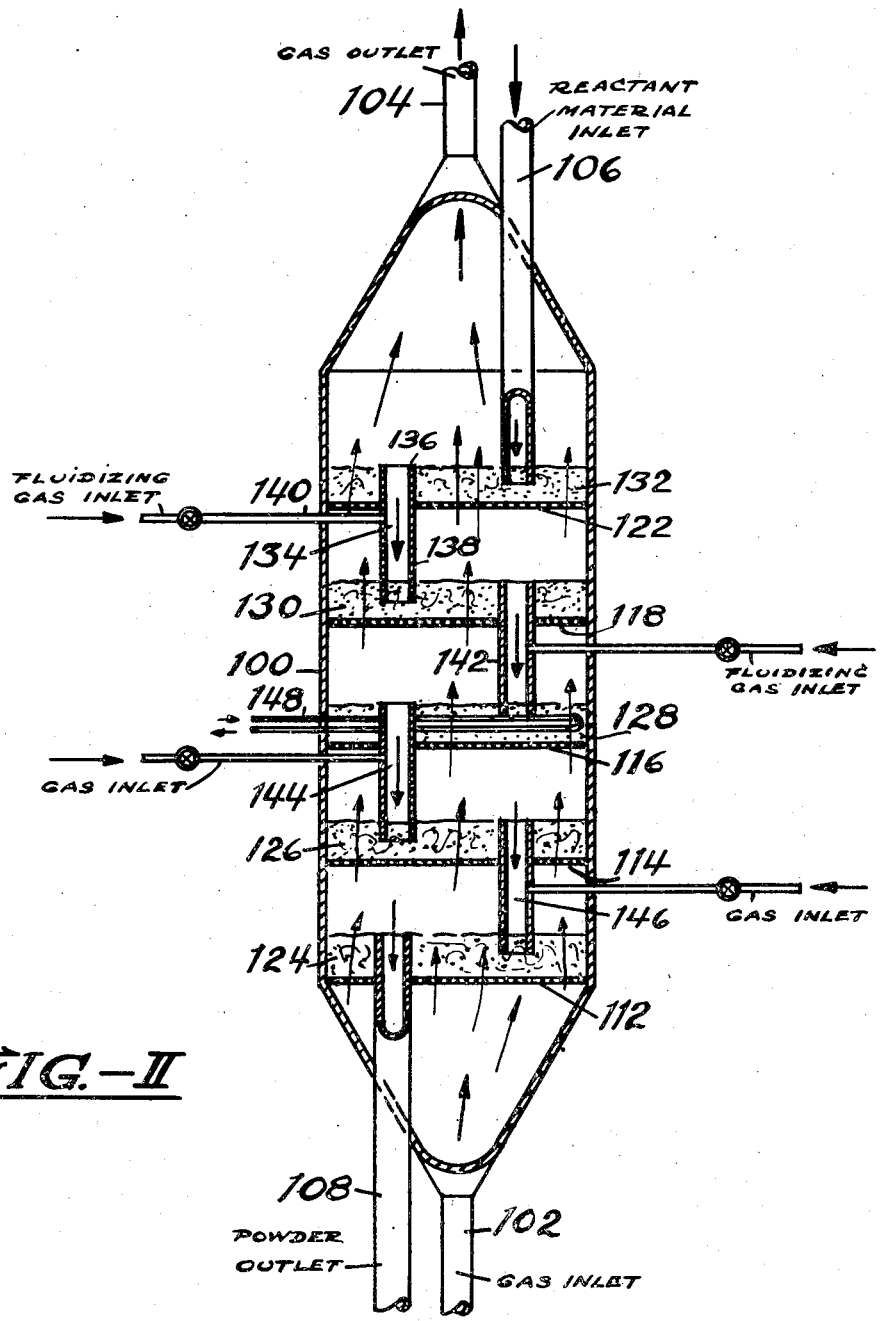
FIG.-II
Eger V. Murphree Inventor
By P. L. Young Attorney Patented Mar. 2, 1948

2,436,870

UNITED STATES PATENT OFFICE 2,436,870

PREPARATION OF CHLORINE

Eger V. Murphree, Summit, N. J., assignor to Standard Oil Development Company, a corporation of Delaware Application October 31, 1942, Serial No. 463,999

5 Claims. (Cl. 23—219)

This invention relates to a method, and apparatus, for preparing chlorine from hydrogen chloride and its easily decomposable salts. It pertains particularly to a process and apparatus for preparing chlorine from hydrogen chloride easily decomposable chlorides by a continuous operation in which contact between the hydrogen chloride and solid reactant materials is the means by which the decomposition of hydrogen chloride is effected.

The electrolysis of aqueous solutions of sodium or potassium chlorides is generally considered to be the more important procedure for the preparation of commercial quantities of chlorine. Economic employment of this process is determined largely by the availability of immediate outlets for the caustic alkalies also produced in the process. The procedure is also of little commercial value for the recovery of chlorine from a variety of industrial by-products and wastes. In these cases, the production of chlorine from hydrogen chloride is more advantageous. No highly desirable commercial process has so far been developed in this field. The present invention presents an improved process for the preparation of chlorine from hydrogen chloride and as such many disadvantages of the prior art procedures are obviated.

The prior art processes for preparing chlorine according to the basic reaction, $4HCl + O_2 \rightarrow 2Cl_2 + 2H_2O$, are largely disadvantageous because of the difficulties involved in obtaining chlorine in high concentrations. In the so-called catalytic procedures, as illustrated by the Deacon process, which employs cuprous chloride as the reaction aid, chlorine is usually obtained in concentrations of considerably less than 20%. The reaction products containing such low chlorine concentrations are generally useful only for the preparation of bleaching powder. In other prior art processes for preparing chlorine the hydrogen chloride is first passed over certain solid metallic oxides, such as those of copper, iron and nickel, under conditions ensuring decomposition of the hydrogen chloride and the metallic chloride so formed is then decomposed in the presence of oxygen-containing gases so as to reform the oxide and release chlorine. In these reactions the metallic agent is employed in granular form arranged in stationary beds contained in reaction tubes or chambers. When the oxide has been converted wholly or in part to the chloride, the flow of hydrogen chloride-containing gas is stopped and the flow of oxygen-containing gas is begun. It is, of course, necessary to adjust the temperature of the metallic agent for each part of the cycle. Such processes, while in general, more advantageous than these of Deacon type are nevertheless commercially disadvantageous because of the intermittent nature of the process and the difficulty in maintaining optimum temperatures.

In the present invention the processing as in the prior art may be in a single stage or in two stages. The reactions in such processes are conducted between the reactants present as constituents of gas-solid dispersions. Thus the production of chlorine directly from hydrogen chloride by single-stage operation and also, the decomposition of hydrogen chloride and the subsequent regeneration of the metallic oxide with the release of chlorine are effected according to the invention by producing the respective suspensions of the solid reactant materials in the gases with which the solids are to react. Conducting the reactions under such conditions is the basis of improved processing for the preparation of chlorine from hydrogen chloride and the avoidance of many of the difficulties associated with the processes of the prior art.

The preparation of hydrogen chloride by single step processing, parallelling the Deacon process, is effected, according to the invention, by passing a mixture of hydrogen chloride and oxygen-containing gases in contact with the metallic oxide or chloride in a finely divided state at a temperature most advantageously suited for reaction to produce chlorine and at a velocity through the reaction zone sufficient to keep the solid material highly turbulent. The gases and powdered material may be introduced into the reaction zone separately or the mixture, as a suspension, may be introduced into the reaction zone or vessel. The velocity of the gases in the reaction zone is preferably so controlled that a substantial quantity of the solid particles is maintained in the reaction vessel, the time of residence of the solid being considerably greater than the time of residence of the gas. Solid material which passes upwards with the gaseous reaction products is removed by separating means preferably positioned in the upper portion of the reaction vessel and the separated solid is returned to the reaction zone.

Two-stage operation for the production of hydrogen chloride according to the invention is effected by employing separate stages for the decomposition of the hydrogen chloride and for the decomposition of the metallic chloride respectively. In this case the powdered metallic oxide is first contacted with the hydrogen chloride-containing gas in a reaction zone under suitable conditions of temperature, pressure and time of contact to bring about reaction. As in the single-stage processing, the gases and powdered material may be introduced into the reaction zone separately. In this manner of processing, it is particularly advantageous to have the finely divided reactant material contact the gas countercurrently. For example, the solid may be passed downward countercurrent to the gas in a tower containing contact devices such as baffles and grids to direct the flow of solid and gas streams. Chlorine recovery may be effected by concurrent contacting of solids and gas; in this case it may be advantageous to employ several concurrent zones, the overall flow of solid and gas being countercurrent.

The suspension in the reaction zone is maintained in a relatively dense state and so controlled as to permit a substantial quantity of the fluidized solid particles to remain for some time in the reaction zone. The solid particles may be made to pass through the reaction zone at about the same velocity as the gas or a relative settling of the solid particles with an upward flow of the gases may be permitted. The relative settling of the solid particles in the reaction zone thus permits the withdrawal from the bottom of the zone of a highly dense gas-solid dispersion containing as the solid constituent the metallic chloride substantially, while any of the solid material passing upwards with the gaseous reaction products is removed by separating means preferably located in the upper portion of the reaction zone. The thus separated powdered material is returned to the lower portion of the reaction zone. While the gas-solid dispersion is held in the reaction zone fairly complete reaction occurs between a substantial portion of the metallic oxide and the hydrogen chloride thus producing steam and the metallic chloride.

The highly dense gas-solid dispersion thus produced is withdrawn from the reaction zone and is then introduced together with an oxygen-containing gas into a second reaction zone, which may be similar in construction to that of the first reaction zone. In this second reaction zone, conditions of temperature, pressure and time of contact are maintained to ensure fairly complete reaction between the metallic chloride and the oxygen-containing gases, chlorine being released and the metallic oxide being regenerated.

The movement of the solid, for example through the reaction zones, is readily effected by maintaining a difference of densities of the fluidized solid in different portions of the processing equipment by controlling the amount of fluidizing gas associated with the solid, in much the same manner as differential hydrostatic pressures are employed in causing the flow of liquids. Thus, in order to maintain the circulation of the gas-solid dispersion throughout the reaction system $d_1h_1$ much be greater than $d_2h_2$ where $d_1$ and $h_1$ are the density and height respectively of the gas-solid dispersion in one portion of the processing equipment and $d_2$ and $h_2$ are the density and height respectively of the gas-solid dispersion in another portion of the processing equipment. The reduction of density of the gas-solid dispersion may be effected at any point in the system by introducing suitable fluidizing gas or the application of heat at any point.

The highly dense gas-solid dispersion may be withdrawn from the reaction zone through a standpipe, the height of which is determined by the requirement of pressure by the gas-solid dispersion to overcome frictional resistance, static head and dynamic head and to effect the flow of the gas-solid dispersion as desired. Fluidizing gas, for example nitrogen or flue gas, may be introduced to the standpipe at a linear rate of about 0.05–0.1 ft./sec. in order to maintain fluidity of the powder.

When standpipes are employed for transferring the fluidized mixture from a low pressure zone to a high pressure zone, it is necessary to have a long vertical column of fluidized mixture in the standpipe. By adding small amounts of a suitable fluidizing gas to the standpipe at various points the gas-solid dispersion is maintained in a satisfactory fluidized state so that pressure is built up due to the weight and material in the column. The standpipe is high enough to provide a pressure at the bottom sufficient to convey the gas-solid dispersion through the balance of the system.

In the various reaction zones, according to the invention, the gas-solid dispersions are maintained in relatively turbulent conditions. Thus, the solid reactants are assured of intimate contact with their respective reactant gases and the temperature in each reaction zone is substantially uniform throughout. The reaction zones may be fitted with special contacting devices resembling bubble trays. Furthermore, means are provided within or external to the reaction zones for cooling or supplying heat as required by the recirculation from other portions of the processing equipment or by recirculating of the fluidized solids through heat exchange devices.

According to the invention processing may be effected in either a single step or in two steps with any of the previously known suitable metallic oxides or intermixtures thereof either with or without supporting carrier material. The processing feature of the invention is, thus, the employment of finely powdered reactant materials as constituents of gas-solid dispersions within which the essential reactions occur. This finely powdered material is usually of particle size not greater than 100 microns, and preferably having less than 40% in the range of 0 to 20 microns. For example, the powdered material may be in the 200–400 mesh range. The initial gas-solid dispersions are prepared by passing the reactant gases or carrier gases through the various powdered materials in streams of velocity sufficient to maintain the dispersions and to effect its flow as a fluidized mass. Suitable gas velocities for this purpose are a minimum of about 4 ft./sec., but higher velocities are usually employed, preferably between about 15 and 25 ft./sec.

The fluidized mass is passed at a suitable velocity to the various reaction zones where temperature and pressure conditions are at suitable levels and are maintained substantially uniform throughout to ensure adequate reaction rates at optimum conditions. As a result of the enlarged cross-sectional area of the reaction zones reduction of velocity of the gas stream usually occurs to between about 0.5 to 2.0 ft./sec. This velocity range may vary somewhat according to variations in the density of the gas-solid dispersion, inlet solids concentration and volume changes. As a result of the reduction in velocity a measure of settling of the solid particles in the dispersion occurs to form a fluidized mixture of greater density than that which enters the reaction zone. Furthermore, this amount of settling permits a certain prolonging of the time the solid is in the reaction zone.

In processing, it is preferable for most of the solid material to remain in the reaction system as constituents of highly dense gas-solid dispersions and only relatively small quantities of the finely powdered solid material passes upwards above the general level in the reaction zone of the gas-solid dispersion. In this manner of processing, the larger quantity of the fluidized mixture can be withdrawn from near the base of each of the reaction zones as highly dense fluidized mixtures and only relatively small amounts of the gas-solid dispersion may be allowed to pass upwards to suitably placed solid separating devices to extract the solid particles. In contrast to the method of operation in which the larger quantity of the fluidized mixture is retained in the reactive zone the gas-solid dispersion may be allowed to pass entirely overhead and separation made of the solid materials in a number of solid separating devices.

The nature of the invention will be more readily apparent from the following detailed description of processing for the production of chlorine from hydrogen chloride involving countercurrent processing in two-stage operation. The drawings Figures I and II present front elevations in diagrammatic form of one modification of apparatus suitable for processing in this manner, according to the invention.

Referring to the Figure I, reference character 10 designates an enlarged vessel or reaction zone wherein hydrogen chloride-containing gases are contacted with a finely divided solid reactant, such as an oxide of iron, nickel, cobalt, copper, etc., or a composite containing same. The gases are introduced into the lower portion of the vessel through line 12. The finely divided solid reactant is introduced into the upper portion of the vessel through line 14. In another modification of the process the gas and solid may both be introduced at the bottom (or a part at the top and part at the bottom). The reactant material may be fresh or may be regenerated as hereinafter to be described. The flow of the finely divided material and the hydrogen chloride-containing gases in this manner is countercurrent in a vessel 10. Also, in order to effect more intimate contact between the solid reactant and the gases it is sometimes preferred to have particular contacting means arranged within the vessel 10.

As shown in Figure I, the reaction zone or vessel 10 may contain contacting devices, which resemble in form and function bubble trays in liquid fractionation devices. Instead of this manner of construction, vessel 10 may be of the nature of a disc or doughnut tower, etc. The vessel is usually constructed, however, to provide particularly intimate contact between the gases and the reactant particles passing through the vessel 10.

Figure II presents an enlarged detail of one advantageous form of the vessel 10. The vessel 100 is provided with a gas inlet 102 at the base and a gas outlet 104 at the top. The vessel is also provided with an inlet pipe 106 extending into top portion of the vessel for introducing the finely divided reactant material. Near the base of the vessel 100 a drawoff or outlet 108 is furnished for withdrawing the finely divided material which has passed downward through the vessel 100.

The vessel 100 is provided with a bottom distributing plate 112 which functions to distribute the incoming gas into the bottom portion of the vessel. The vessel 100 is also provided with suitably spaced perforated plates 114, 116, 118 and 122 for confining the fluidized mass and for distributing the upflowing gas through the fluidized solid material. The layers of fluidized particles 124, 126, 128, 130, and 132 are confined on the respective perforated plates 112, 114, 116, 118 and 122. The gas passing upwardly through the vessel 100 fluidizes the solid particles on each of the perforated plates so that the reactant particles or fluidized mass flows as a liquid and downward passage of solids through the grids is substantially prevented.

As finely divided solid reactant is continuously introduced onto the top plate 122 by means of the inlet pipe 106 the level of the fluidized mixture rises and overflows into a downflow pipe 134, which extends upwardly from the top perforated plate 122. The downflow pipe is arranged so that a portion 136 extends above the perforated plate 122 and another portion of suitable length 138 extends below the perforated plate 122 to a level preferably within the mass of fluidized solid particles on the next lower perforated plate 118. The downflow pipe may be fitted with an aeration duct 140 for injection of fluidizing gas.

The fluidized solid particles flow down the pipe 134 onto the next lower perforated plate 118 until the mass reaches the level at or preferably above the pipe 142 which carries the fluidized mixture to the next lower perforated plate 116. The downflow pipe 142 extends through the perforated plate 118 and has a portion projecting above the plate 118 and another portion projecting below the plate 118 described in connection with the first downflow pipe 134.

Another downflow pipe 144 is furnished which extends through plate 116 and which permits downflow of the fluidized solid particles to the next lower perforated plate 114. Another downflow pipe 146 is furnished which extends through the perforated plate 114 and conducts the fluidized solid particles to the bottom perforated plate or distribution plate 112. The outlet pipe 118 extends above the perforated plate 112 so that a layer of fluidized solid particles is built up on the plate and when it reaches a level at or above the top of the outlet pipe 108 it flows out of the vessel 100.

In the processing of gases, the hydrogen chloride-containing gases are introduced into the bottom of the vessel 100 and contact the solid particles on the separate perforated plates as the gas travels upwards. The velocity of the gas is so controlled that the solid particles on each of the perforated plates are maintained in fluidized condition. The treated gas leaves the vessel 100 through line 104. In passing upward the gas passes countercurrent to the movement of the finely dispersed solid reactant material. The solid particles are maintained on the perforated plates and as the powdered material is introduced into the top of the vessel onto the top plate 122, the fluidized mixture rises above the top 136 of the first downflow pipe 138 onto the next lower perforated plate 118 from which it passes through the succeeding downflow pipes to lower plates finally withdrawn from the vessel 100 through the outlet 108. The bottom of each downflow pipe must be below the level of the fluidized solids, on the tray or grid below it. For example, the bottom of the inlet pipe 106 is below the level of the top 136 of the downflow pipe 134.

With the arrangement of contacting means as described in connection with reaction vessel 100, intimate contact between the gases and reactant particles is effected and the flow of gas and fluidized solid is more truly countercurrent than in vessels which do not have such contacting means. If desired, heating or cooling coils 148 may be situated in the spaces between the plates, preferably in contact with the fluidized solid. For example, in Figure II coils 148 are shown as being arranged in dense phase between plates 116 and 118.

For purposes of this illustration, the solid reactant material is taken as being ferric oxide. Hydrogen chloride-containing gases are introduced into the reaction vessel or zone 10 (100) through line 12 at a temperature of about 250° C. and at somewhat above atmospheric pressure. The finely divided ferric oxide particles introduced through line 14 are at about the same or somewhat lower temperature. The ferric oxide particles may be of such size that substantially all of the particles are in the range of 50 to 400 mesh of the standard series. The relative amounts of gases introduced through lines 12 and 14 respectively are such as to form a gas-solid dispersion in the reaction zone between about 10 and 50 lbs. of solid material per cubic foot of gas. The density, however, may deviate from this range as necessary to suit particular processing requirements, especially as to the particular contacting means employed in the reaction vessel 10. The upward velocity through vessel 10 of the stream introduced through line 12 is usually between 0.2 and 5.0 ft./sec. and preferably between 1.0 and 2.0 ft./sec. in order to prevent any substantial portion of the fluidized solid from passing overhead. The temperature maintained within the reaction zone is usually between 250° C. and 400° C. and the pressure somewhat above atmospheric. When the stream velocity in the reaction vessel is between 0.5 and 2 ft./sec. the appearance of the fluidized mixture is somewhat similar to a boiling liquid, whereas at higher velocities the appearance is somewhat of that of a dense cloud with a rather indefinite level demarcation.

The gaseous reaction products pass overhead through line 16. While the velocity of the gases through the vessel 10 (100) is relatively low the gaseous reaction products generally carry some of the solid particles overhead. It is desirable to remove these solid particles from the reaction products and the vapors passing through line 16 are introduced into separating means 18 which may be any suitable separating means but indicated in the drawing as being a cyclone separator. The separating means may of course be located within the reaction vessel. More than one separating means may be used if considered desirable. In the separating means 18, the gaseous reaction products are separated from the solid reaction products, namely, in this illustration, ferric chloride. The gaseous reaction products, largely water vapor, unreacted material and other carrying gas pass overhead through line 20 and may be recycled if desired. The separated solid particles collecting in the separator 18 are returned through line 24 to the vessel 10.

The ferric chloride particles which move downward in the reaction vessel 10 are passed through a suitable stripping section, which may be located within the vessel or externally thereto, for removing residual reactants or undesirable gases. Suitable stripping gas may be introduced into the bottom portion of the reaction vessel 10 through line 32. In some cases it is advisable to have the stripping effected in separate equipment since it is important that no water be carried over into the second reaction zone 50. Stripped solids comprising ferric chloride and ferric oxide particles are withdrawn from the bottom of the reaction vessel 10 through standpipe 34 having a valve thereon 36. Recycle gas is introduced into line 34 below valve 36 by means of line 38 and the finely divided ferric chloride particles are carried in suspension through line 42 to a heater 44. The ferric chloride particles then pass through line 46 into the top portion of the reaction vessel or zone 50, which is similar in design and construction to vessel 10.

Oxygen, air or oxygen containing gas is introduced into the lower portion of the reaction zone 50 through line 54. The reaction zone 50 is of substantially the same construction as the reaction zone 10 previously described. The reaction zone 50 may be provided with bubble caps and down spouts for providing intimate contact between the solid particles and the air or it may be similar to reaction vessel 100 shown in Figure II. The finely divided ferric chloride particles pass downwardly through the reaction zone 50 and the air passes upwards in countercurrent relationship thereto.

In the heater 44 the temperature of the fluidized solids stream is raised to about 500° C. and at about this temperature the stream passes into the reaction zone 50. The relative amounts of air and of ferric chloride particles introduced into the reaction zone 50 are such as to form a gas-solid dispersion having a density between about 10 and 30 lbs. of solid material per cubic foot of gas. The density may vary beyond this range to suit particular processing requirements. The velocity of the air stream through the reaction zone is usually between 0.2 and 5.0 ft./sec. but preferably between 1.0 and 2.0 ft./sec. The temperature maintained in the reaction zone is generally between 450° C. and 550° C. but preferably and in this illustration, in which ferric chloride is employed, about 500° C. The pressure maintained in the system is usually about atmospheric but it may be above or below atmospheric pressure according to processing in particular cases required. The superficial velocity of the gas stream passing upwards through the reaction zone is preferably regulated to prevent any substantial portion of the fluidized mixture passing overhead, that is, the velocity is maintained below about 2 ft./sec.

Chlorine and such diluents as are present leave the top of the reaction tower through line 56 and as the stream carries a certain amount of finely divided ferric oxide particles, it is desirable to pass the stream through separating means 58 to recover the solid particles. The separating means 58 may be of any suitable construction but is indicated in the drawing as being a cyclone separator. More than one separating means may be used as considered desirable. The chlorine together with nitrogen and unreacted oxygen pass overhead through line 62 and is passed to a box cooler 64. The cooled product then passes through line 66 to chlorine collection equipment, such as a compressor or absorption equipment.

The separated particles withdrawn from the bottom of the separating means 58 may be returned to the upper portion of the reaction zone 50 through line 64. The solid particles in the reaction zone 50 are maintained in a fluidized condition during their passage through the zone 50. Suitable stripping or purging gas is introduced into the bottom portion or purging zone 66 of the reaction vessel 50 through line 68 to recover entrapped chlorine from the solid particles in the lower portion of the zone 50. The ferric oxide particles are withdrawn from the bottom of the zone 50 through line 72 having a valve thereon 74. The ferric oxide particles are passed through line 76 and passed through the cooler 78 and then passed through line 89 which is shown in T-connection with the feed line 14 into the reaction zone 10. In the cooler 78 the temperature is lowered to about 250° C., that is, about the minimum temperature suitable for the reaction in zone 10.

Some of the solid particles may be lost from the system by entrainment with the gases leaving the separating means. In order to maintain the amount of solid particles substantially constant in the system fresh ferric oxide particles may be introduced into the system through line 14 and thus introduced into the reaction zone 10.

The nature and objects of the present invention having been thus described and illustrated, what is claimed as new and useful and is desired to be claimed by Letters Patent is:

1. In a process for producing chlorine by reacting hydrogen chloride with a metal oxide and reacting the metal chloride so formed with an oxygen-containing gas to release chlorine and reform the metal oxide, the steps of passing the metal oxide in fluidized condition downwardly through a first reaction zone in a plurality of stages, wherein it is reacted with countercurrent hydrogen chloride vapor to form the metal chloride and steam is evolved at the upper end of each stage, introducing a dry stripping gas into the lower portion of said first zone to strip the steam from said metal chloride, passing the fluidized metal chloride from a lower part of said first reaction zone to an upper part of a second reaction zone, passing said fluidized metal chloride downwardly through said second reaction zone in a plurality of stages, reacting said metal chloride with countercurrent oxygen-containing gas in each of said stages to reform the metal oxide and evolve chlorine, withdrawing resulting chlorine-containing gases from the upper part of said second reaction zone, withdrawing reconverted dispersed metal oxide from a lower part of said second reaction zone, returning said metal oxide in dispersed condition to an upper part of said first reaction zone, and recycling a portion of the withdrawn chlorine-containing gases for admixing with the metal chloride from said first reaction zone, to increase dispersion and assist flow thereof into said second reaction zone.

2. In a process for producing chlorine by reacting hydrogen chloride with a metal oxide and reacting the metal chloride so formed with an oxygen-containing gas to release chlorine and reform the metal oxide, the steps of passing the metal oxide in fluidized condition downwardly through a first reaction zone in a plurality of stages, reacting said metal oxide with countercurrent hydrogen chloride vapor to form the metal chloride and to evolve steam at the upper end of each stage, controlling at least one of said stage temperatures by heat exchange means, introducing fluidizing gas between successive stages, passing the metal chloride in fluidized condition from a lower part of said first reaction zone to an upper part of a second reaction zone, passing said fluidized metal chloride downwardly through successive stages in said second reaction zone, countercurrent to oxygen-containing gas to reform the metal oxide and evolve chlorine, introducing fluidizing gas between successive stages in said second reaction zone, withdrawing resulting chlorine-containing gases from the upper part of said second reaction zone, withdrawing dispersed reformed metal oxide from a lower part of said second reaction zone and returning it to an upper part of said first reaction zone, and recycling a portion of the withdrawn chlorine-containing gases and admixing said portion with the metal chlorides from said reaction zone.

3. A continuous process for preparation of chlorine from hydrogen chloride which comprises passing through a first reaction zone a finely divided metal-oxide-containing material flowing downwardly as a dense gas-solid dispersion at a temperature between about 250° C. to 400° C. and at about atmospheric pressure to a lower part of said reaction zone countercurrently to hydrogen chloride gas to form a finely divided metallic chloride reaction product dispersion with attendant evolution of water vapor, withdrawing said dispersed metal chloride from the lower part of said first reaction zone, removing a gaseous stream containing water vapor from the upper part of said first reaction zone, flowing the metal chloride dispersion continuously in heated condition into an upper part of a second reaction zone at a temperature of between about 450° C. and 550° C. then countercurrently in said second zone to an upwardly directed stream of oxygen-containing gas passed therethrough at a velocity to form a gas-solid dispersion of metal oxide reaction product with an evolution of chlorine, withdrawing resulting chlorine-containing gases from the upper part of said second reaction zone, withdrawing the resulting dense gas-solid dispersion of metal oxide from a lower part of said second reaction zone, cooling said withdrawn gas-solid dispersion of metal oxide, then returning said dispersion to an upper portion of said first reaction zone, and recycling a portion of the withdrawn chlorine-containing gases for admixing with the said metal chloride dispersion to cause the resultant dispersion from said first zone to flow into the upper portion of said second reaction zone.

4. A continuous process according to claim 3 in which the metal oxide containing material contains a chemical inert carrier substance.

5. A continuous process according to claim 3 in which the finely divided metal oxide containing material is fluidized in a hydrogen chloride-containing gas.

EGER V. MURPHREE.

REFERENCES CITED

The following references are of record in the file of this patent:

UNITED STATES PATENTS

| Number | Name | Date |
|---|---|---|
| 1,355,105 | Canon | Oct. 5, 1920 |
| 1,512,225 | Kipper | Oct. 21, 1924 |
| 1,810,055 | Muller et al. | June 16, 1931 |
| 1,979,280 | Mitchell | Nov. 6, 1934 |
| 1,984,380 | Odell | Dec. 18, 1934 |
| 2,020,431 | Osborne et al. | Nov. 12, 1935 |
| 2,206,399 | Grosvenor | July 2, 1940 |
| 2,270,903 | Rudbach | Jan. 27, 1942 |
| 2,303,047 | Hemminger | Nov. 24, 1942 |
| 2,304,128 | Thomas | Dec. 8, 1942 |